3,399,026
PROCESS FOR THE PRODUCTION OF FAST ORANGE DYEINGS ON STRUCTURES OF AROMATIC POLYESTERS, ESPECIALLY OF POLYETHYLENE-TEREPHTHALATES
Wilhelm Happe, Schwalbach, Taunus, Germany, and Hermann Hoffmann, West Warwick, R.I., assignors to Farbwerke Hoechst Aktiengesellschaft vormals Meister Lucius & Bruning, Frankfurt am Main, Germany, a corporation of Germany
No Drawing. Filed Mar. 9, 1965, Ser. No. 438,401
Claims priority, application Germany, Mar. 18, 1964, F 42,358
6 Claims. (Cl. 8—25)

ABSTRACT OF THE DISCLOSURE

Process for dyeing aromatic polyesters orange with an aqueous dispersion of a dyestuff mixture consisting of isomeric dyestuffs of the formulae

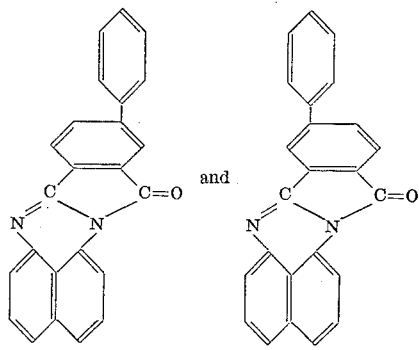

The present invention provides a process for the production of fast orange dyeings on structures of aromatic polyesters, especially of polyethylene terephthalates.

It has been found that fast orange dyeings can be produced on structures of aromatic polyesters, especially of polyethylene terephthalates, for example on filaments, ribbons, woven fabrics or fibers by treating the structures with an aqueous dispersion of the condensation product of 1,8-diaminonaphthalene and 4-phenyl-phthalic acid anhydride.

The afore-mentioned structures of aromatic polyesters are advantageously dyed in the presence of carriers at temperatures between about 95° C. and 105° C., preferably at about 100° C., or according to the high temperature process in the absence of carriers at temperatures between about 120° C. and 140° C., preferably between about 120° C. and 130° C. The dyestuff can also be very readily applied to the structures according to the thermosol process, wherein the material to be dyed is impregnated with a dispersion of the dyestuff, dried and subjected to a short heat treatment at high temperatures.

The brilliant orange dyeings, obtained according to the process of the present invention, are distinguished by good to excellent fastness properties and particularly by a very good fastness to heat-setting (fastness to sublimation). The very good fastness to heat-setting of the dyeings obtained according to the process of the present invention on polyesters is in so far surprising as with the dyestuffs of nearest comparable constitution, which are used according to French Patent No. 1,166,701 for dyeing polyester materials, and in particular with the phthaloperinone mentioned in Example 1 of the afore-said patent, dyeings having only a moderate fastness to heat-setting are obtained on polyester material.

The dyestuff used according to the process of the present invention can be prepared by condensing 1,8-diaminonaphthalene with 4-phenyl-phthalic acid anhydride in a molar ratio of about 1:1 in glacial acetic acid at the boiling temperature. An isomeric mixture is obtained which consists of the dyestuffs of the formulae

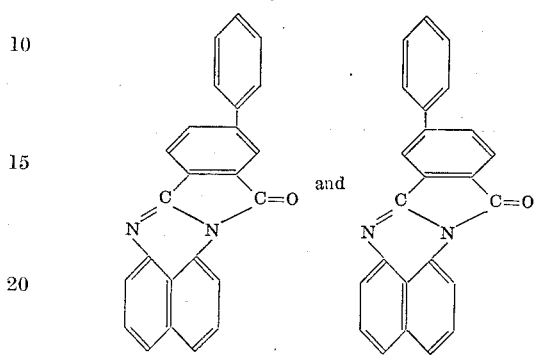

The following examples serve to illustrate the invention, but they are not intended to limit it thereto:

Example 1

5 grams of a fabric of polyethylene terephthalate are dyed for 1 hour at 120° C. in a bath which contains 0.1 gram of the finely dispersed condensation product of 1,8-diaminonaphthalene and 4-phenyl-phthalic acid anhydride in 200 cc. of water. The dyeing so obtained is rinsed in the heat, and in order to improve its fastness to rubbing it is treated at 80–90° C. for about 15 minutes in a new bath which contains per liter 2 grams of sodium dithionite, 2 cc. of sodium hydroxide solution (38° Bé.) and 0.5 gram of a non-ionic detergent (polyglycolether). The red-orange dyeing thus obtained possesses a very good fastness to heat-setting.

Example 2

5 grams of a fabric of polyethylene terephthalate are treated for 90 minutes at about 98° C. in a bath which contains 0.1 gram of the condensation product of 1,8-diaminonaphthalene and 4-phenyl-phthalic acid anhydride in finely dispersed form and furthermore, 1 gram of a carrier on the basis of dispersed o-phenylphenol in 200 cc. of water. The dyed material is then treated according to the method described in Example 1. The red-orange dyeing, thus obtained, which has a somewhat weaker tint than that described in Example 1, possesses a very good fastness to heat-setting.

Example 3

A fabric of polyethylene terephthalate is padded on the padding machine with a dyestuff dispersion containing per liter of water 10 grams of the condensation product of 1,8-diaminonaphthalene and 4-phenyl-phthalic acid anhydride and 10 grams of polyacrylic acid amide as padding auxiliary. The dyed material is squeezed to a moisture absorption of about 60%, dried, subjected to a thermo-fixation process for 1 minute at 210° C. and finally to a reductive after-treatment as described in Example 1. The orange dyeing, thus obtained, possesses the same fastness properties as the dyeings obtained according to Examples 1 and 2.

We claim:
1. A process for producing fast orange dyeings on structures consisting of aromatic polyesters, which comprises treating said structures with an aqueous dispersion of a dyestuff mixture consisting of isomeric dyestuffs of the formulae

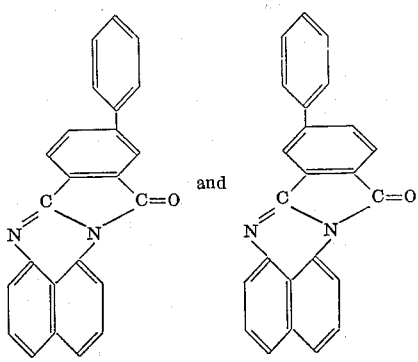

2. The process as claimed in claim 1, wherein said structures are dyed in the presence of a carrier at a temperature between about 95° and 105° C.

3. The process as claimed in claim 1, wherein said structures are dyed in the presence of a carrier at about 100° C.

4. The process as claimed in claim 1, wherein said structures are dyed in the absence of a carrier at a temperature between about 120° and 140° C.

5. The process as claimed in claim 1, wherein said structures are dyed in the absence of a carrier at a temperature between about 120° and 130° C.

6. The process as claimed in claim 1, wherein said structures are impregnated with a dispersion of the dyestuff mixture, then dried and finally submitted to a short dry heating at a temperature between about 190° and 210° C.

References Cited

UNITED STATES PATENTS

| | | | |
|---|---|---|---|
| 2,891,061 | 6/1959 | De Larve | 260—251 |
| 3,103,403 | 9/1963 | Eaton et al. | 8—55 |

FOREIGN PATENTS 730,692   5/1955   Great Britain.

NORMAN G. TORCHIN, *Primary Examiner.*

J. T. HERBERT, JR., *Assistant Examiner.*